United States Patent
Abuduweili et al.

(10) Patent No.: US 10,452,242 B2
(45) Date of Patent: Oct. 22, 2019

(54) SYSTEM AND METHOD OF PROVIDING A COMPUTER NETWORKING TOOL AND INTERFACES

(71) Applicant: Cisco Technology, Inc., San Jose, CA (US)

(72) Inventors: Aikepaer Abuduweili, San Jose, CA (US); Susie Wee, San Jose, CA (US); Ming Zhu, Shanghai (CN); Yajun Zhang, San Jose, CA (US); Siqi Ling, Shanghai (CN); Rizhi Chen, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 426 days.

(21) Appl. No.: 15/176,086

(22) Filed: Jun. 7, 2016

(65) Prior Publication Data

US 2016/0357416 A1    Dec. 8, 2016

Related U.S. Application Data

(60) Provisional application No. 62/172,118, filed on Jun. 7, 2015.

(51) Int. Cl.
| | |
|---|---|
| *G06F 3/048* | (2013.01) |
| *G06F 3/0484* | (2013.01) |
| *H04L 12/24* | (2006.01) |
| *G06F 3/0482* | (2013.01) |
| *G06F 3/0481* | (2013.01) |

(52) U.S. Cl.
CPC ........ *G06F 3/04845* (2013.01); *G06F 3/0482* (2013.01); *G06F 3/04817* (2013.01); *G06F 3/04842* (2013.01); *H04L 41/12* (2013.01); *H04L 41/22* (2013.01); *G06F 2203/04806* (2013.01)

(58) Field of Classification Search
CPC .......... G06F 3/048; G06F 17/00; G06F 15/16; G06F 3/041; G06F 3/00; G06F 17/30
See application file for complete search history.

(56) References Cited

U.S. PATENT DOCUMENTS

| | | | |
|---|---|---|---|
| 7,818,673 B2 | 10/2010 | Cunningham et al. | |
| 8,989,052 B2 | 3/2015 | Jing et al. | |
| 9,223,461 B1* | 12/2015 | Brown | G06F 3/0485 |
| 9,240,930 B2 | 1/2016 | Smith et al. | |
| 9,292,403 B2 | 3/2016 | Bostic et al. | |
| 2002/0147805 A1* | 10/2002 | Leshem | G06F 11/32 709/223 |
| 2005/0134589 A1* | 6/2005 | Heer | G06F 3/0481 345/440 |

(Continued)

*Primary Examiner* — Hugo Molina
(74) *Attorney, Agent, or Firm* — Polsinelli PC

(57) ABSTRACT

A system, method, and computer-readable storage device configured to display a network topology on a display screen of a computing device. The network topology includes a first group of components in an expanded format and a second group of components in a collapsed format. An input is received that is associated with the second group of components, and is arranged to cause the second group of components to be expanded into the expanded format. Finally, the method includes, based on a parameter and the input, automatically collapsing the first group of components from the expanded format into the collapsed format.

14 Claims, 20 Drawing Sheets

(56) References Cited

U.S. PATENT DOCUMENTS

| | | | |
|---|---|---|---|
| 2006/0136459 A1* | 6/2006 | Trinon | G06F 9/542 |
| 2013/0067417 A1* | 3/2013 | Andersson | G06F 3/0482 |
| | | | 715/854 |
| 2013/0104088 A1* | 4/2013 | Santos-Gomez | |
| | | | G06F 17/30994 |
| | | | 715/854 |
| 2013/0239066 A1* | 9/2013 | Brugler | G06F 17/30994 |
| | | | 715/854 |
| 2014/0096058 A1* | 4/2014 | Molesky | G06F 17/211 |
| | | | 715/771 |
| 2014/0101602 A1* | 4/2014 | Barrett | G06F 3/0485 |
| | | | 715/784 |
| 2014/0223328 A1* | 8/2014 | Thomas | G06F 3/14 |
| | | | 715/747 |
| 2015/0169699 A1* | 6/2015 | Gilbert | G06F 3/0482 |
| | | | 707/722 |
| 2015/0288569 A1 | 10/2015 | Agarwal et al. | |

\* cited by examiner

SYSTEM AND METHOD OF PROVIDING A COMPUTER NETWORKING TOOL AND INTERFACES

PRIORITY CLAIM

The present non-provisional application claims priority to U.S. Provisional Application No. 62/172,118, filed Jun. 7, 2015, the contents of which are incorporated herein by reference.

TECHNICAL FIELD

The disclosure relates generally to computer networking tools and interfaces with respect to how to graphically display information relating to networks. More particularly, the disclosure addresses an Internet-centric and/or graphical problem associated with the complexity of providing graphically pleasing and understandable views of networking topologies. The disclosure provides various examples of concepts that facilitate the presentation and manipulation of network topologies such that labels, nodes and groupings of nodes are presented in a visually pleasing manner.

BACKGROUND

Network visualization programs or systems generally illustrate connectivity of network devices through basic node and link connections. Current network visualization systems present graphical views of the many components and/or devices found in data centers or enterprise networks. However, current graphical representations of such networks are not particularly intelligent in a manner that provides a readily understood representation of a network. The disclosure addresses the Internet-centric problem and/or graphical interface problem of how to present complex network topologies to users in a manner that is easy to comprehend.

BRIEF DESCRIPTION OF THE DRAWINGS

The disclosure will be readily understood by the following detailed description in conjunction with the accompanying drawings in which.

Figure 1:
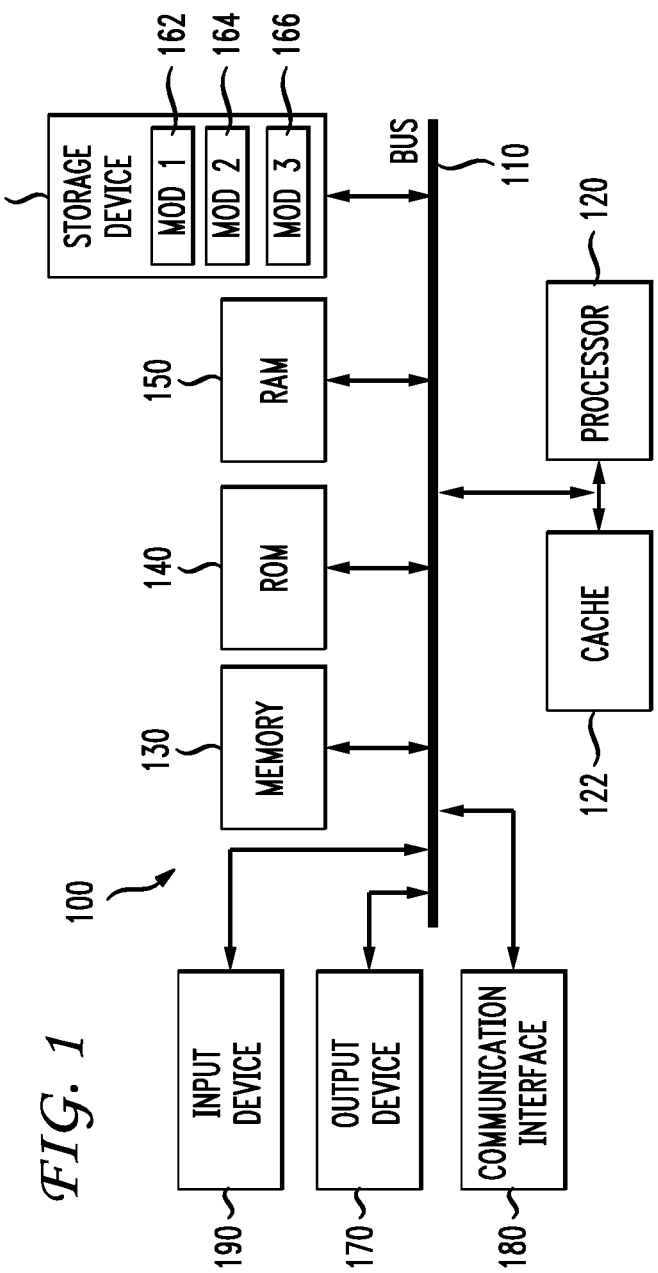
FIG. 1 illustrates the basic computing components of a computing device according to an aspect of this disclosure.

DESCRIPTION OF EXAMPLE EMBODIMENTS
OVERVIEW

Disclosed are three general concepts related to improvements in how a graphical representation of a network topology is presented to a user. In one aspect, a method includes a system performing operations including presenting a graphical representation of a network topology including a plurality of interconnected components. The system receives input from a user that causes a change in the representation of the network topology. The change can be a zooming in operation, a zooming out operation, a movement of a component, an expansion of a group of components or an aggregation of a group of components. The system can adjust labels in several ways. In a first example, the system can analyze generally the space around a node and the connections or links to the node and identify an open space or region into which the label will be positioned. In another example, the system can segment the regions around the node and analyze which segments contain links, labels or other objects, and to select a region free from occlusions and position the label in that selected region. For example, the system, for a respective component having a label, divides space around the graphical representation of the component into a number of segments. The system analyzes each segment of the number of segments to determine which segment space has the least occlusions with connecting lines, icons or any other object. The system then adjusts the label associated with the respective component such that the label is positioned in a chosen segment in the space around the respective component to minimize or eliminate the label being occluded by or overlapping with any other object, connecting line or icon. The system can also select an alignment for the label that further reduces any possible occlusion.

In another example, the disclosure provides a method practiced by a system for adjusting a node size in a graphical representation of a network topology. The system, prior to presenting the graphical representation of the network topology with a respective node, performs an analysis of a density of icons within the viewing area to be shown or displayed. The system can also calculate a potential overlapping percentage in different icon sizes. Based on the results of such calculations, the system will select a preferred icon size or size of the respective node and include that size in the graphical representation. The benefit of this approach is that it can be performed in real time such that any time a user zooms in our zooms out or changes a graphical view of the network topology, the algorithm can apply such that the resulting change in the graphical view will be presented to the user with an appropriate icon size. At different size levels, the system can also adjust an amount of detail for individual nodes or icons. For example, a small icon can simply be a shape and one color. As the size grows, more detail can be provided that can be perceived properly by a user viewing the graphical interface.

The third aspect relates to aggregation and expansion of groups of nodes in a presented graphical user interface of a network topology. The general idea is to aggregate components based on a particular property (such as device type or geography) or properties to aggregate in groups. This enables people to concentrate on what they care about. For example, a network may include 1000 devices but the user may only really be interested in the group of devices within a particular building. The graphical interface can aggregate nodes outside of the building into a simpler presentation and then show the detail for the nodes in that building. Devices can have tags added to devices in a particular building or other characteristics for type of devices or any other identification tag. In one aspect, the aggregation is the gathering of all the data and information about individual nodes. The system then uses that data to generate the algorithm for collapsing and expanding visual representations of nodes to make the graphical interface more pleasing and understandable.

A method is practiced by a system and includes the system displaying a network topology on a display screen of a computing device, the network topology including a first group of components in an expanded format and a second group of components in a collapsed format. When an input is obtained, such as a user clicking on a node or a group of nodes, or a user interacting with the second group of components, the second group of components can be expanded into a second expanded format. The user interaction with the second group of components is meant to indicate that the user desires the expansion of the second group of components. Finally, the method includes the system collapsing the first group of components from the expanded format into the collapsed format. The collapsing can be automatic and based on one or more of the input, a parameter, and the expanding of the second group of components. For example, when the user desires to expand the second group of components, the system can determine, based on a parameter such as geographical distance or a determined interest level, to automatically collapse the first group of components to maintain a pleasing distribution and density of graphical features on the display representing the network topology.

It is also noted that the algorithm can cause the automatic expansion of components as well. In the example above, the user desired to expand components and the system applied the algorithm to automatically and intelligently collapse components. The user may interact with an icon to collapse components. In that case, the algorithm can, based on one or more of that interaction, a parameter, and the collapsing of the components, intelligently cause an expansion of a group of components if it will still maintain a pleasing density of graphical features representing the network topology.

DESCRIPTION

The present disclosure addresses the Internet-centric need of how to properly present complex graphical representations of network topologies when the topologies can have many components that, if presented on a graphical display, can be confusing or not easy to follow. Three concepts are disclosed. The first concept relates to label placement around a node. The second concept relates to adjusting a node size as well as how much level of detail to provide to the node. The third concept relates to aggregating and expanding groups of nodes in the graphical interface in a more intelligent manner to aid the user in having a graphical representation of the network topology that is easier to comprehend.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Having discussed the basic computing components that can apply to a system example of the present disclosure, we now turn to a graphical user interface showing a network topology. A framework for creating network topologies in web/network/cloud applications utilizes determined connectivity and defined roles of network devices to create a substantially role-based hierarchical view of the network. Defined roles of network devices can include, but are not limited to, hierarchical connectivity roles such as from a border router, provider edge (PE), customer edge (CE), core device, gateway, leaf switch, spine switch, or Internet of Things (IoT) "thing." The ability to effectively automatically populate a layout of a network topology allows for unique aggregation and expansion algorithms that may either show more or fewer devices based on, for example, a level of zoom and/or a level of interest. The concepts disclosed herein will typically obtain information about the network topology from a server that is in communication with the various components within the network. Thus, the server will receive data about the various gateways, routers, IoT thing, etc. and obtain the various roles of the network devices and build the graphical representation of the network topology for presenting on a display to a user.

Labels

In the first concept discussed herein, a network topology representation such as a graph or diagram, includes labels for components in the representation. As components are manipulated within a diagram, the labels may dynamically move as the components are manipulated. A label for a component in a diagram that is manipulated may move to prevent overlap with the component, as well as with other components in the diagram.

Figure 2A:
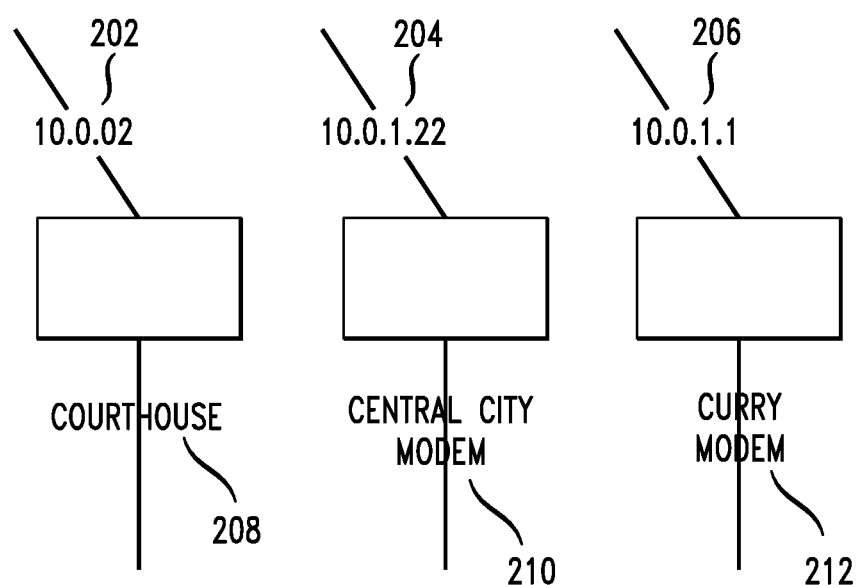
FIG. 2A illustrates several network components with labels that overlap connecting lines.

With reference to FIGS. 2A-D, the automatic repositioning of labels associated with objects in a network visualization diagram or network topology graph will be described in accordance with an example. FIG. 2A illustrates a problem with using labels associated with components in part of a network topology 200. For example, nodes 208 (A server at the courthouse), 210 (a modem for Union City) and 212 (the Curry Modem) show labels overlapping with communication links. Similarly, IP addresses 202, 204 and 206 are also listed on top of communication links in FIG. 2A. As can be appreciated, given how cluttered some network topologies can become, having labels overlap communication links, nodes or any other object, can increase the difficulty of comprehending or viewing the topology.

Figure 2B:
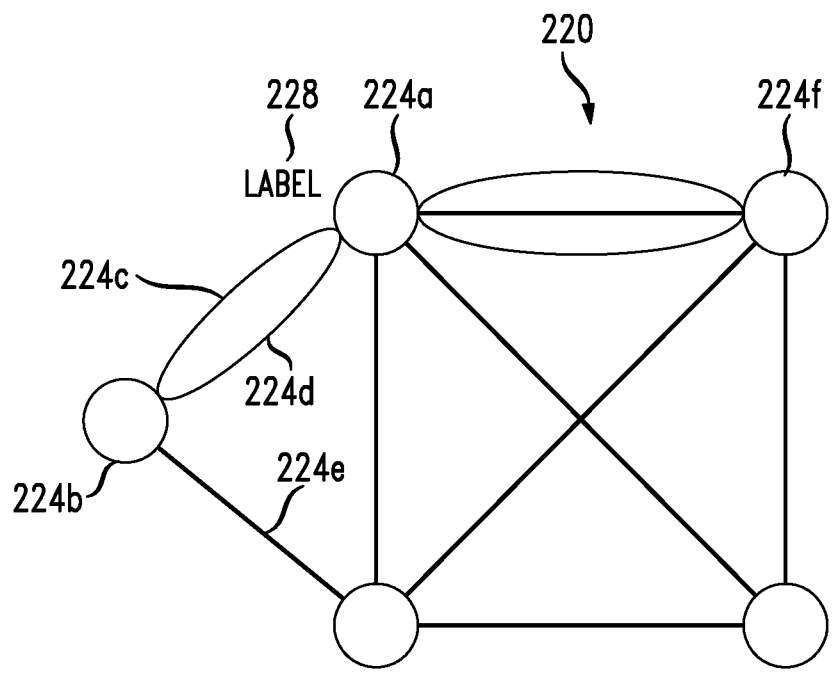
FIG. 2B is a diagrammatic representation of a network topology graph or network virtualization diagram in a first state at a time t1 in accordance with an example.

The following figures and discussion provide an algorithm to improve the labeling aspect of a graphical presentation of a network topology. As shown in FIG. 2B, a network visualization diagram or graph 220 includes multiple components 224a-f. Components 224a-f may generally include devices such as component 224a, component 224b, and component 224f, and links such as component 224c, component 224d, and component 224e. Devices may generally be network elements, and may include, but are not limited to including, routers, PEs, CEs, core devices, gateways, and/or IoT devices.

Component 224a has an associated label 228. It should be appreciated that while substantially all components 224a-f within network visualization diagram 220 may have associated labels, only label 228 is shown for ease of illustration. Label 228 can generally include information associated with component 224a, such as a name of the component, a type of the component, and/or properties of the component. Label 228 is displayed such that label 228 does not overlay components 224a-f, and is not obscured by components 224a-f. At a time t1, label 228 is discloses to the upper left of component 224a.

Network visualization diagram 220 is arranged to be manipulated, e.g., components 224a-f may be moved or altered. Components 224a-f can be moved or changes on the graphical user interface. For example, a user may interact in some way with the display to zoom in, expand, collapse, and/or perform a manual relocation. When such changes occur, the system implements an algorithm for making decisions on how to adjust associated labels such as label 228. Such changes to the label can be automatically and dynamically moved so as not to overlap components 224a-f.

Figure 2C:
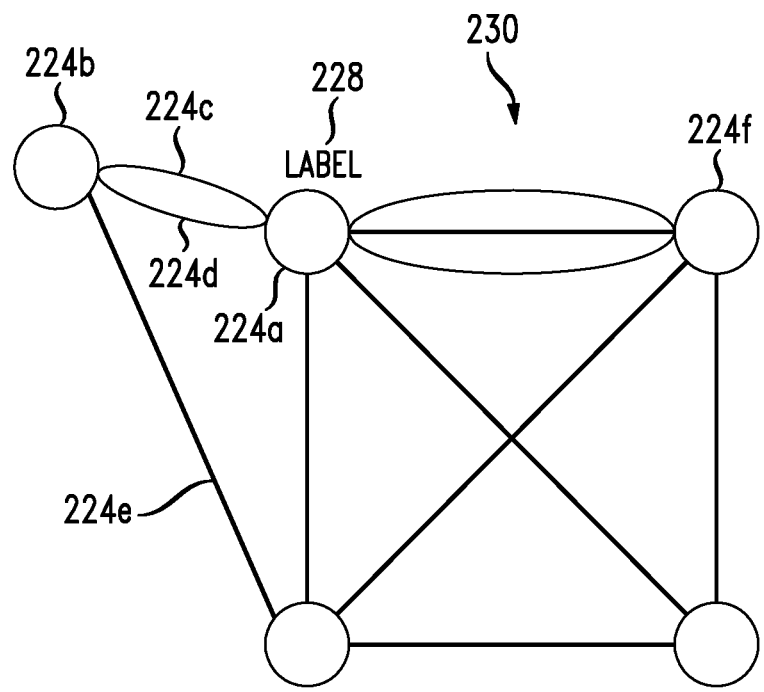
FIG. 2C is a diagrammatic representation of the network topology graph or network virtualization diagram of FIG. 2B in a second state at a time t2.

Referring next to FIG. 2C, network visualization diagram 230 is shown at a time t2 after component 224b has been moved. A user can manipulate the position of 224b in any manner such as through a mouse click or a gesture or voice command. When component 245b is moved, component 224c, component 224d, and component 224e are affected. The new position of component 224b is such that component 224c is moved to substantially the same position originally occupied by label 228, i.e., at a time t1.

At time t2, label 228 is repositioned to the upper right 228 of component 224a, such that label 228 will not overlap component 224c. In general, label 228 is automatically and dynamically positioned such that label 228 does not overlap any links, e.g., component 224c, that connects to component 224a. One suitable method used to determine where to position label 228 with respect to component 224a will be discussed below with respect to FIGS. 3A and 3B. In general, label 228 may be positioned in proximity to component 224a at a location in which the largest amount of unoccupied space is available.

Figure 2D:
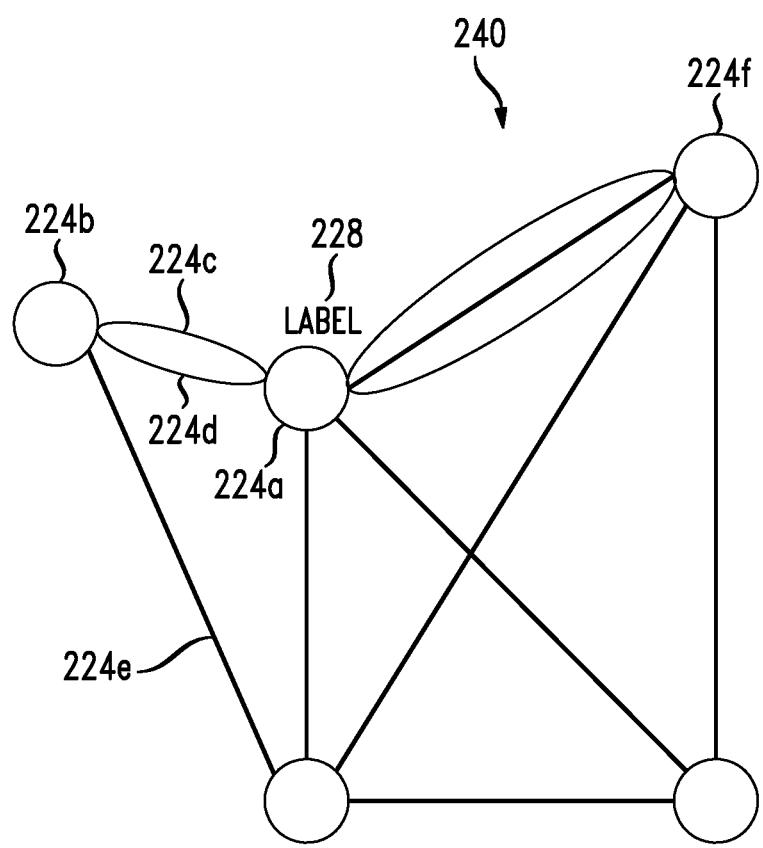
FIG. 2D is a diagrammatic representation of the network topology graph or network virtualization diagram of FIG. 2B in a third state at a time t3.

FIG. 2D is a diagrammatic representation of network visualization diagram 240 at a time t3 after component 224f has been moved. The movement of component 224f results in label 228 being automatically and dynamically repositioned to the lower left of component 224a such that label 228 does not overlap, and is not overlapped by, any components 224a-f.

There are several approaches to properly positioning the label as referenced above. One approach involves the system analyzing the space around the icon and determining which area is most open around the icon. The system enables the placement of the label in the open area. The system can identify the area with the largest space around the icon given various links that are attached to the node. The largest space is chosen and the label is placed in that region. Preferences as to label location and alignment can be applied as disclosed herein.

Another approach is to segment the space and see which segment has the least lines crossing it. The system could also just decide on the number of segments, like 4 segments, and then analyze the space in each segment and put the label in the segment with the least degree of overlap with a link. In this case there may be one segment without a link therein which can make the decision straightforward. In another case, each segment may have a link but given the position of the link within the segment, some segments may have more space available for labels than others. The algorithm then selects a beneficial segment in which to put the label. In one case, the system segments the space at one amount (say 4 segments) and if a link remains in each segment, then the system resegments the space to provide 6 or 8 segments and then reevaluates until segments are found without links. As can be appreciated, there are different ways to handle the determination of where to place a label. This second approach is described in more detail next.

Figure 3A:
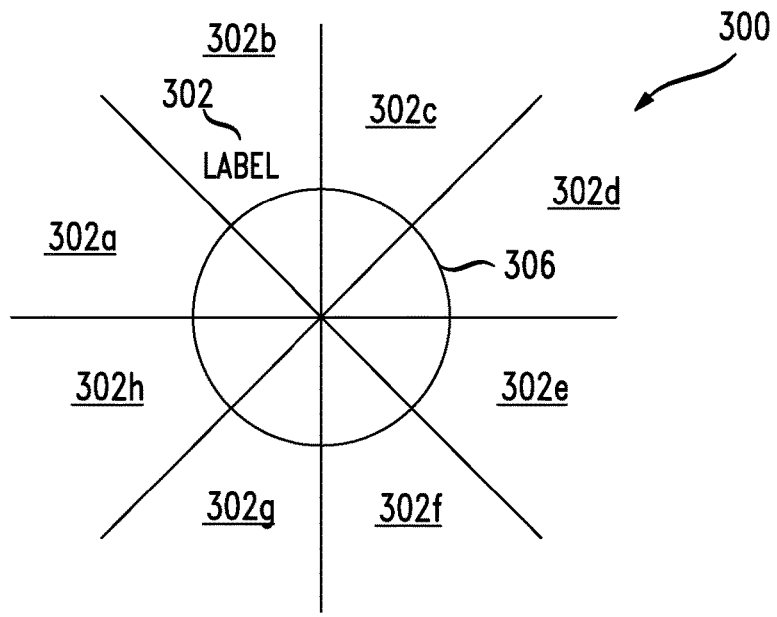
FIG. 3A is a diagrammatic representation of multiple zones around a component into which a label corresponding to the object can be placed.
Figure 3B:
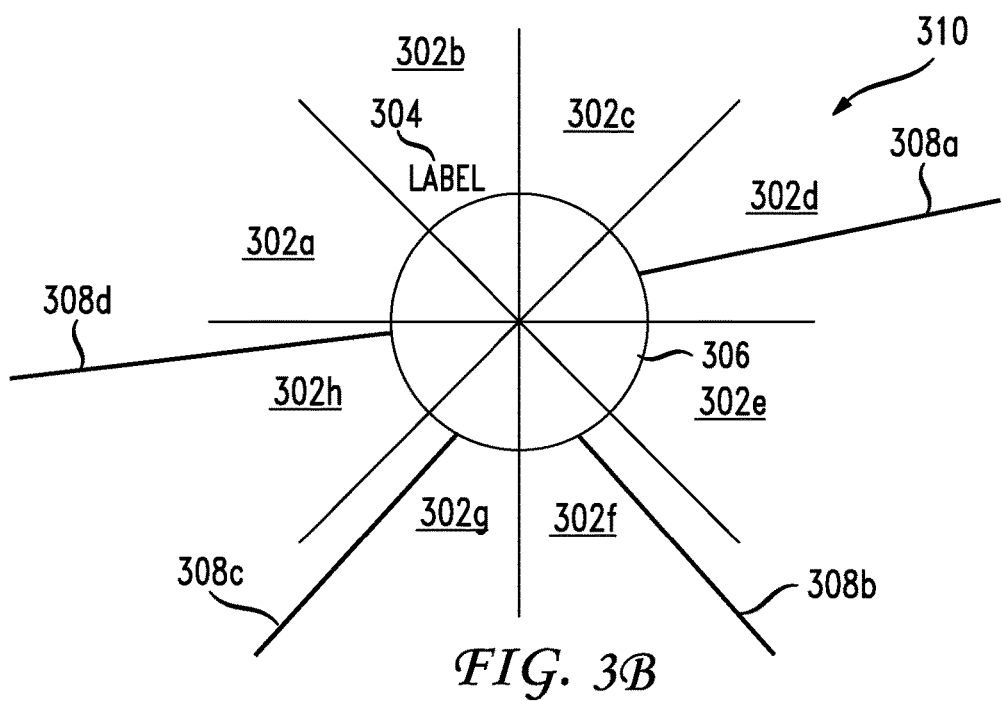
FIG. 3B is a diagrammatic representation of multiple zones around a component which depicts other objects in some zones which are taken into consideration when identifying a zone in which to place a label in accordance with an example.

Referring next to FIGS. 3A and 3B, a method for determining where to position a label with respect to its associated component or object will be described in accordance with an example. An area around node 364 is shown 300 as being divided into segments. A component 306 may have multiple zones 302a-h defined around component 306, as shown in FIG. 3A. In the embodiment as shown, component 306 has approximately eight zones 302a-h defined about a perimeter of component 306. Label 304, which includes information associated with component 306, is positioned within zone 302b.

Typically, component 306 may be connected to other components (not shown) in a network virtualization diagram. As such, component 306 may have links 356a-d, as shown in FIG. 3B, which are located within some of zones 302a-h. An algorithm which determines a desirable zone 302a-h within which to position label 304 can consider which zones 302a-h has links 356a-d located therein. Label 304 is positioned in zone 302b, which is furthest away from links 356a-d and may, therefore, be identified as the most desirable zone for the placement of label 304. In addition to being identified as being the zone furthest away from links 356a-d, it should be understood that other factors may be considered when identifying zone 302b as the most desirable zone for the location of label 304.

In one embodiment, identifying a most desirable zone 302a-h within which to position label 304 may include finding a largest angle around component 306, e.g., a node. If more than one angle may be considered to be the largest angle, then an appropriate zone 302a-h may be selected using any suitable predetermined criteria. For example, when more than one angle may be considered to be the largest angle, then a most suitable zone 302a-h may be selected in an order such that a zone at the bottom of component 306 may be selected first if available, followed by a zone at the top of component 306, then a zone at the right of component 306, and then a zone to the left of component 306. Based on the nearest region, a text align direction may be selected. If a potential position for label 304 would overlap another node or link, the corresponding angle or zone may be removed from consideration, and a new largest angle around component 306 may be identified.

Figure 4A:
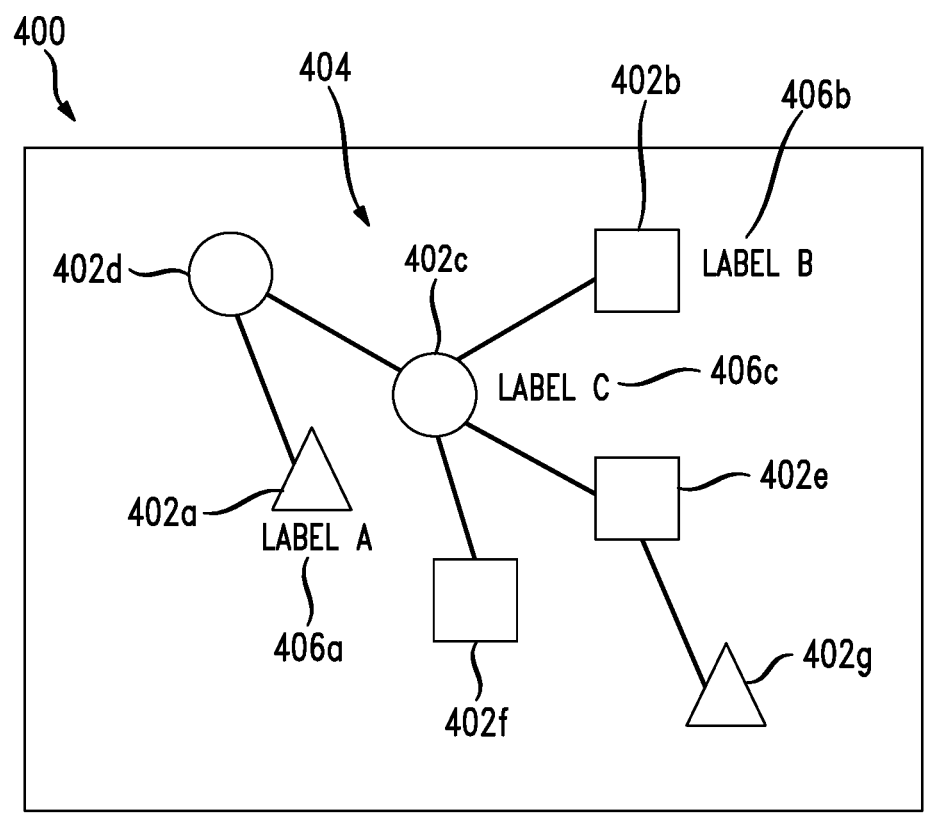
FIG. 4A illustrates labels in a network topology at time t1.

As mentioned above, aggregation and expansion algorithms can be used with respect to a network visualization program to show more or fewer devices in a network visualization diagram based on a level of zoom. In addition, more or fewer labels may also be shown based on a level of zoom. FIG. 4A is a diagrammatic representation of a display screen in which a network topology is displayed and a first amount of information associated with the network topology is shown in accordance with an embodiment. A display screen 468 displays a network topology or a network visualization diagram 472. Included in network visualization diagram 472 are components 454a-g, with components 454a-c having labels 458a-c. As shown, components 454a-g have different shapes. Typically, the different shapes represent different types of components or objects. In addition to having different shapes, components 454a-c may have different colors, while some component may have more complicated structures that are multi-colored, three dimensional, and so forth.

Labels 458a-c represent a first amount of information, and each label 458a-c is visible on display screen 468. As shown, label 458a is associated with component 454a, label 458b is associated with component 454b, and label 458c is associated with component 454c.

Figure 4B:
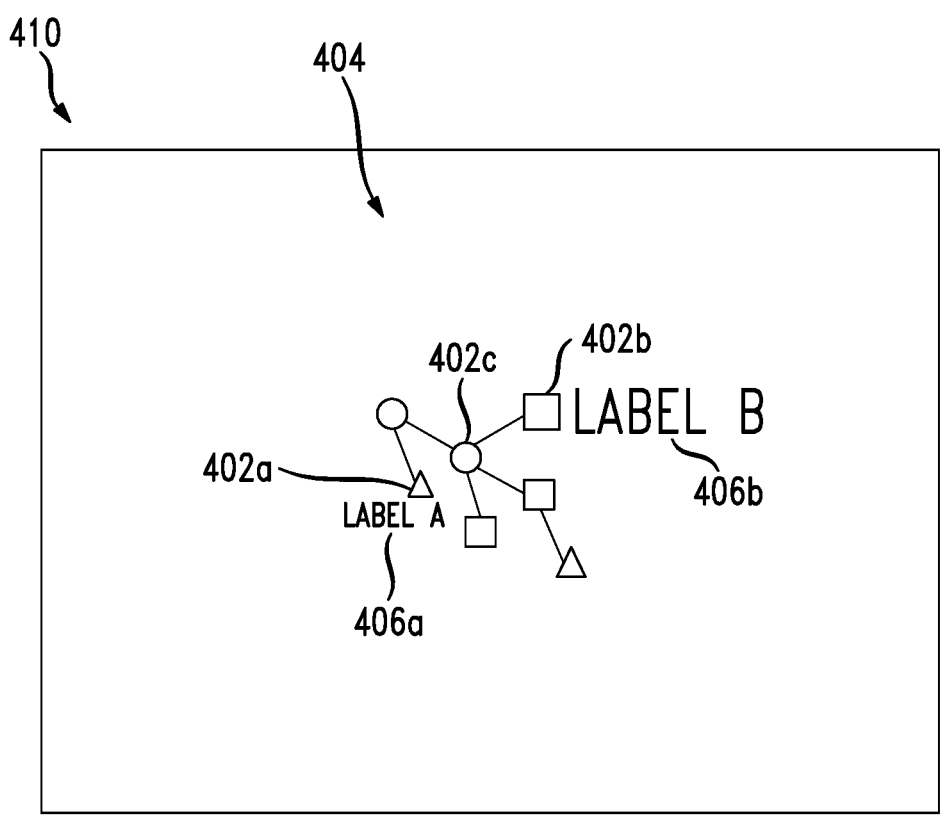
FIG. 4B illustrates a change in label position and size at a time t2 after a user has zoomed out from the network topology of FIG. 4A.

FIG. 4B is a diagrammatic representation display screen 468 in which visualization diagram 472 is displayed after a first zoom out process. In this case, assume that the user has provided input to the system to instruct the system to zoom out the graphical interface. Network virtualization diagram 472 is smaller than shown in FIG. 4A due to a zoomed out view, and fewer labels 454a, 458b are visible.

It is noted that label 458c, which was shown in FIG. 4A, is not visible in FIG. 4B due to the decreased overall size of network virtualization diagram 472. In the embodiment as shown, label 458b is the same size as in FIG. 4A, while label 458a is a smaller size. Thus, the algorithm can analyze the density and structure of the diagram 472 after a zoom in or a zoom out and made adjustments on which labels to show, where to show the labels, and/or what size font to show the labels.

Figure 4C:
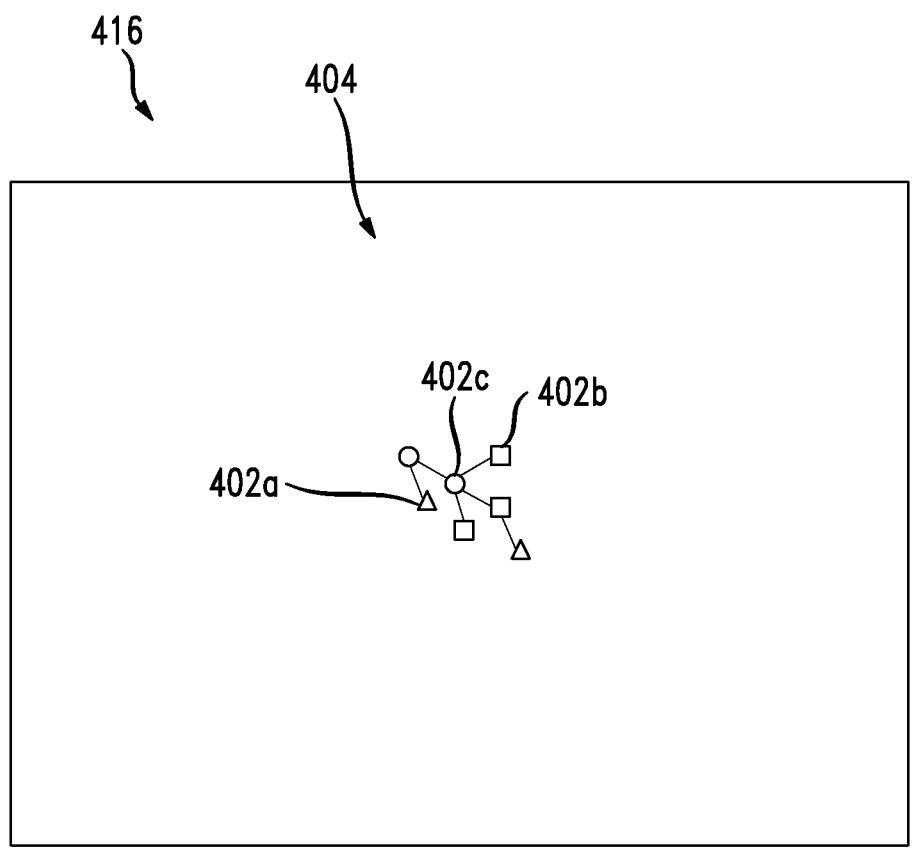
FIG. 4C is a diagrammatic representation of a topology graph at a time t3 after a label has been repositioned when a user has zoomed out.

FIG. 4C is a diagrammatic representation of display screen 468 in which a network topology is displayed after a second zoom out process in accordance with an embodiment. Network virtualization diagram 472 is zoomed out within display 468 such that no labels are visible. In one embodiment, network virtualization diagram 472 is fully zoomed out, and at a fully zoomed out level, the shapes of components 454a-c are visible.

Figure 5A:
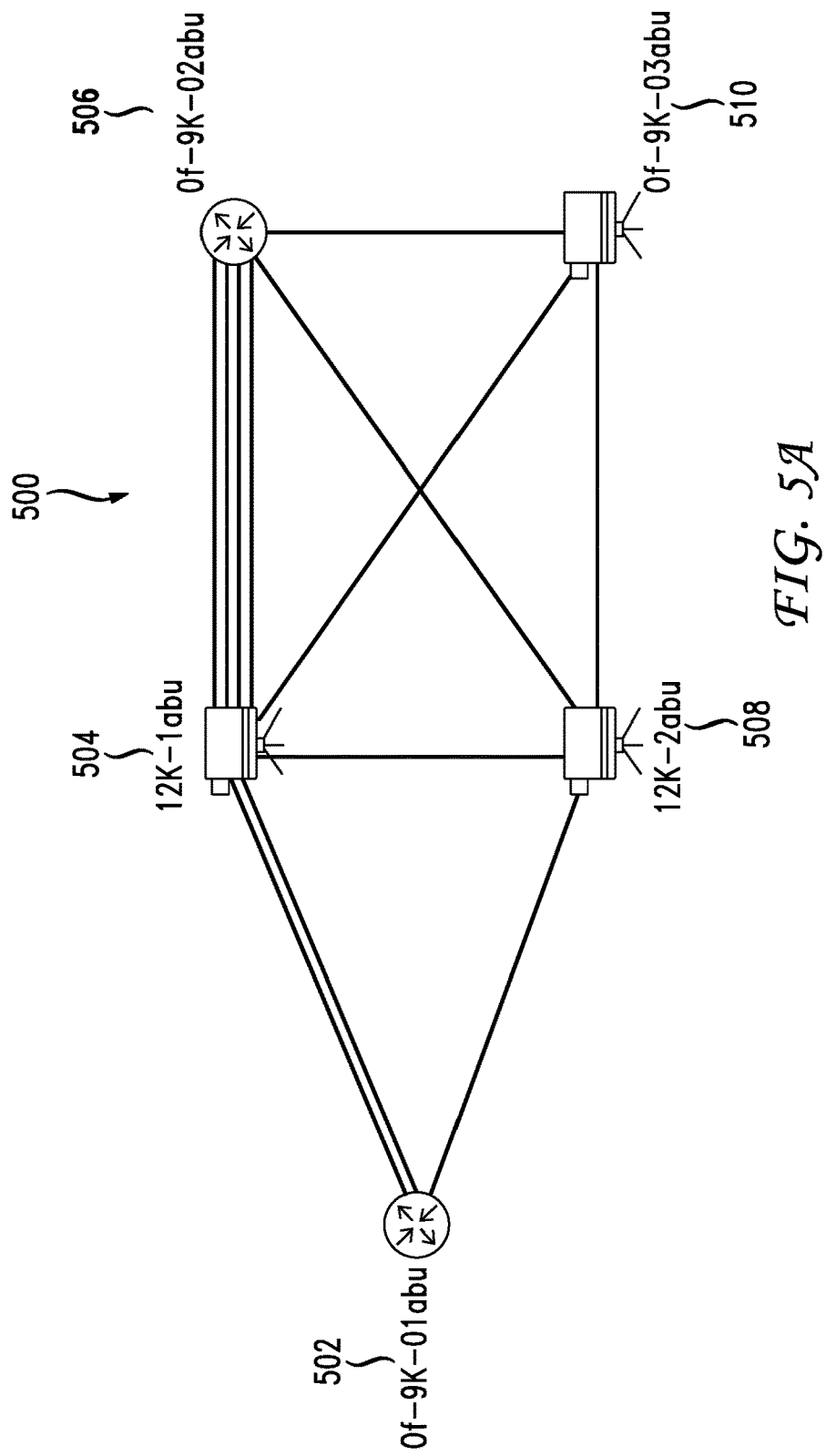
FIG. 5A illustrates a network topology with labels positioned according to an aspect of this disclosure for a time t1.
Figure 5B:
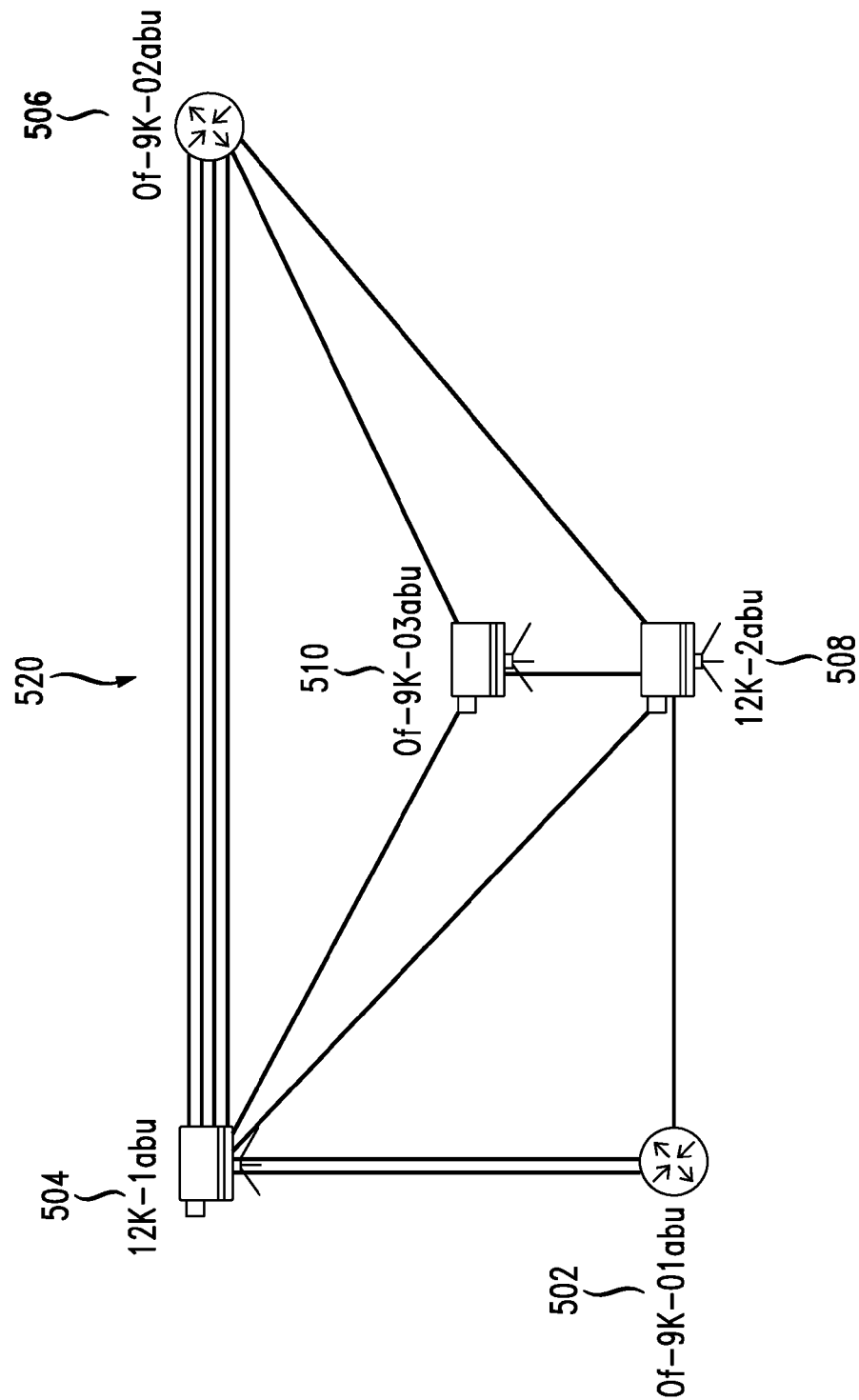
FIG. 5B illustrates the adjustment in the network topology with respect to the label positions at a time t2 in which a user had moved components to new locations from the network topology of FIG. 5A.

FIG. 5A illustrates a network topology 500 with 5 different components. Routers 502 and 506 are shown with their respective labels OF-9K-01ABU and OF-9K-02ABU. Cameras 504, 508, 510 are also shown with their respective labels 12K-1ABU, 12K-2ABU and OF-9K-03ABU. As can be appreciated, the labels that are provided in FIG. 5A do not overlap with any of the connecting lines. Now assume in FIG. 5B that a user has adjusted the positions of several of the components in FIG. 5A. As can be seen in FIG. 5B, camera 510 (OF-9K-03ABU) has been moved from the lower right-hand corner of the display into approximately the center of the display. Camera 508 (12K-2ABU) has not been moved but generally remains in the same position. Node 502 (OF-9K-01ABU) has been moved down to the same horizontal position as Node 508. Node 504 (12K-1ABU) has been moved from the top middle portion to a left-hand corner of the display screen. Node 506 (OF-9K-02ABU) has generally remained unmoved. As can be appreciated, given the number of connecting lines between these various nodes, of such a move were to take place, then one could potentially have one of the labels being listed on top of one of the communication lines. The algorithm disclosed herein, however, when a user makes such an adjustment from the positions of the nodes in FIG. 5A to the position of the nodes in FIG. 5B, will analyze the space around each node and make a resulting decision with respect to the labels and were they are positioned in the new configuration. Thus, FIGS. 5A and 5B illustrate graphically how the labeling algorithm works in both aspects in which the space around nodes are analyzed generally or whether the space around the nodes are segmented.

Although only a few embodiments have been described in this disclosure, it should be understood that the disclosure may be embodied in many other specific forms without departing from the spirit or the scope of the present disclosure. By way of example, the number of zones, as well as the configuration of zones, around an object into which a label may be placed may vary widely. In one embodiment, increasing the number of zones around an object may enable better positioning of a label.

During a zoom out process on a network visualization diagram, the amount of information contained in a label may change. For example, a longer label in a regular or standard view of a network visualization diagram may be shortened in a zoomed out view of the network visualization diagram to maintain visibility. That is, less information may be provided in a label in a zoomed out view of a network visualization diagram.

Figure 6:
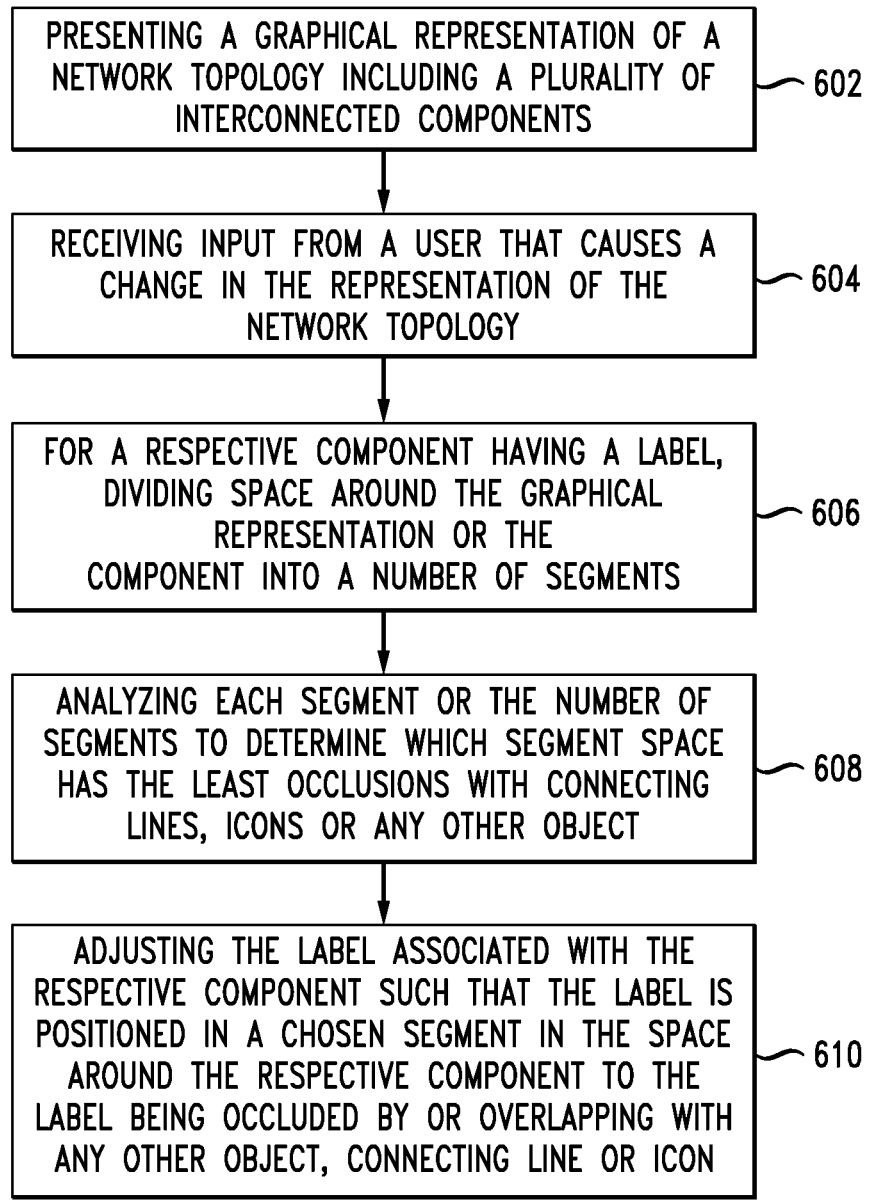
FIG. 6 illustrates a method example related to how to present labels in a graphical representation of a network topology.

FIG. 6 illustrates a method example of the label adjustment concept. The system 100 performs the steps of the method. The system can perform operations including presenting a graphical representation of a network topology including a plurality of interconnected components (602). The system receives input from a user that causes a change in the representation of the network topology (604). The change can be a zooming in operation, a zooming out operation, a movement of a component, an expansion of a group of components or an aggregation of a group of components. The system, for a respective component having a label, divides space around the graphical representation of the component into a number of segments (606). In one characterization, the system calculates or analyzes the space around the node in order to determine where to place the label, but without formally segmenting the space. In the segmenting aspect of the algorithm, for example, if there are three links to the node, the algorithm may divide the space around the node into 4 segments. The segments may be equal or unequal or they may have variable walls defining each segment. The system analyzes each segment of the number of segments to determine which segment space has the least occlusions and/or clutter with connecting lines, icons or any other object (608). The system then adjusts the label associated with the respective component such that the label is positioned in a chosen segment in the space around the respective component to minimize or eliminate the label being occluded by or overlapping with any other object, connecting line or icon (610). The system can also select an alignment for the label that further reduces any possible occlusion. The system can in one aspect also select an alignment for the label depending on the available space or any other factor.

The system may not perfectly minimize or eliminate occlusions but, within a reasonable range, make choices with regard to which segment to place a label that is respectable in terms of how uncomplicated the viewing of that label is to a user. The algorithm implemented by the system can also define or choose the position within the segment for the label. Preferences can be implemented as well. For example, the system can place the label at the bottom of the segment when possible. Other choices of course are at the top of the segment, middle of the segment or any other position within the segment.

Similarly, given the data known about the possible occlusions and clutter around the node, the system can also select a text alignment for the label. Within the segment, the system can align the label on the left, right, middle or in some other position based on the known data. The purpose of course is to present the label in an uncluttered manner for user viewing. An order of preferences could be applied, such as first at the bottom, then the top, then the left, and then the right. Any order could be chosen. If the label is at the top or the bottom region of a node, the algorithm can choose to align the label at middle. A label positioned at left side can align to the right. If the label is placed at the right side of a node, the system can align the label to the left. Of course, each of these preferences is adjustable and selectable.

The font size of the label can also be adjusted by the algorithm so that if the label would otherwise be too small to read, the system can increase the font size. Many parameters associated with the label can be adjusted by the algorithm to achieve the goal of presenting the label in a position with a lower number or the least number of occlusions and possible overlap with other objects or connections. These parameters include one or more of font size, font choice, angle of the label (although horizontal is preferred), whether the label is bold, italics, or underlined, color, whether the label is flashing or static, whether label is hidden, and so forth. Any one or more of these parameters can be adjusted and implemented in this example. Changes made to an element can also be relative to changes made to other elements. For example, an increase of a label size can automatically result in a decrease of another label size. The system can analyze a potential density or network graphical configuration to determine when to automatically perform a sizing and/or other type of operation for a label.

Node Size

One difficulty in graphical representations of network topology is determining at what size to display a node. In yet another embodiment, when the overall size of a network topology representation is reduced within a viewing screen (such as when a user zooms out), the size of components of the network topology may be changed. The system can evaluable a density of the various components and the adjusted graphical representation of the topology and, based on the density, can adjust factors such as a node size, shape, color, complexity, frequency, etc. For example, the size of the components may be changed while the overall shape of the components remains substantially the same. In another example, one or more of the shape, the color the graphical complexity, or any other graphical characteristic or temporal characteristics of a component can be adjusted. In addition, details related to the components, e.g., labels of the components, can be changed or eliminated in order to prevent those details from overlapping the components. The node size/shape algorithm can also apply in connection with the collapsing/expanding algorithm as well. Both can be applied in a realignment of the network topology displayed in the graphical interface.

Figure 7A:
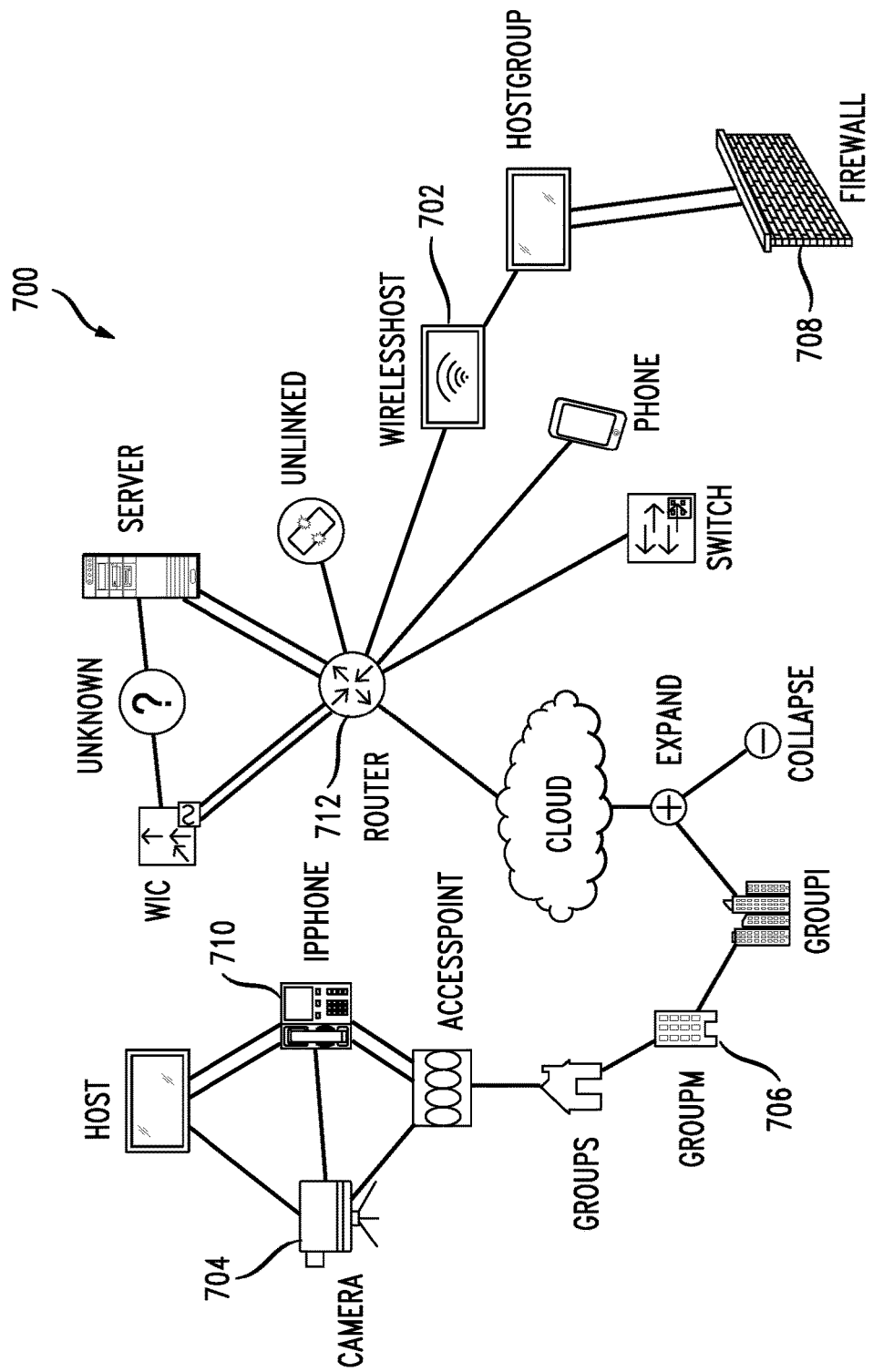
FIG. 7A is a diagrammatic representation of a display screen in which a network topology is displayed and a first amount of information associated with the network topology is shown in accordance with an example.

FIG. 7A illustrates an example network topology according to an aspect of this disclosure. Several nodes will be highlighted. For example, a wireless host node 702, a camera 704, a group M of 706, a firewall 708, and I-phone 710 and a router 712 are all shown by way of example. Note the size and detail of the respective nodes in FIG. 7A.

Figure 7B:
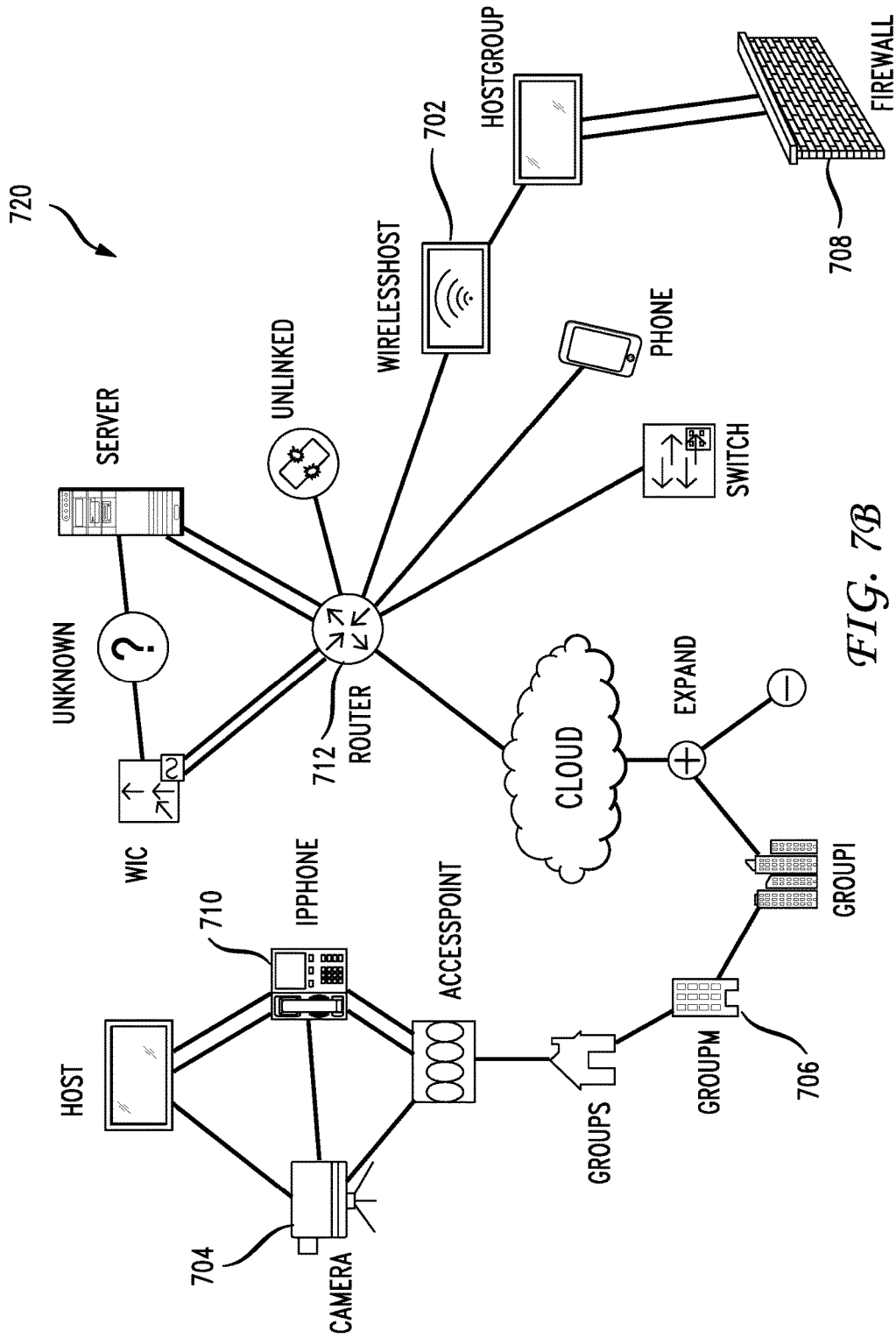
FIG. 7B is a diagrammatic representation of a display screen in which a network topology is displayed after a first zoom in process to illustrate adjustments to node size and label positions.

FIG. 7B illustrates an updated visual of the network topology 720. In this case, assume that a user has provided input in which the user has zoomed in on the entire topology. The various nodes mentioned (702, 704, 706, 708, 710, 712) as well as the other nodes are shown as being larger than they were in FIG. 7A. In this regard, in order to provide the sizing of the nodes as well as the locations of labels, prior to displaying the nodes in FIG. 7B, the system performed the operation of detecting a density of the icons in the viewing area and calculating a potential overlapping percentage in different icon sizes. Based on the calculation result, the system concludes or recommends and then displays a preferred icon size for the network topology 720. This is a real time operation in which the system will automatically update the various node or icon sizes in a reasonable amount of time after the user zoom operation.

In some respects, the system can have several preset levels for icon sizes. Thus, at a different size level, the level of details provided for each icon can be varied. In some cases when the icons are displayed in very small sizes, the system may only just present a basic shape and/or color of the icon because other details may not be recognizable by human eyes and look messy and distracting.

Figure 7C:
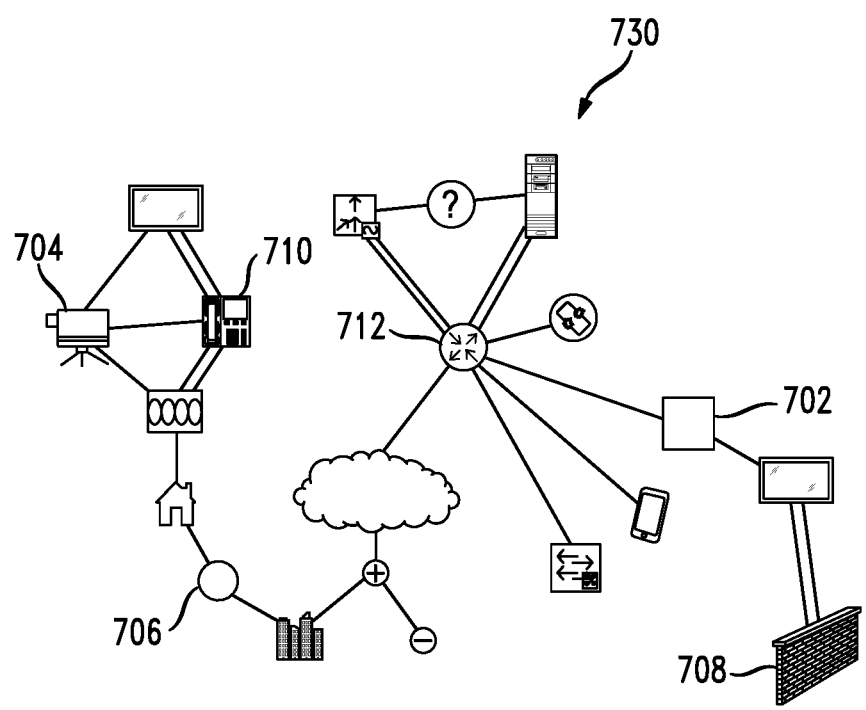
FIG. 7C is a diagrammatic representation of a display screen in which a network topology is displayed after a zoom out process and a different amount of information associated with the network topology is shown.

FIG. 7C illustrates this point. In FIG. 7C, the network topology 730 is shown in which the user has then zoomed out such that the various nodes are smaller. In this case, we show by example that all of the node sizes are smaller but in some cases the shape has changed. For example, the group M icon, which previously looked in FIG. 7A and FIG. 7B like a small building, is now changed to a circle inasmuch as the details of the building are not as likely to be recognizable at the smaller size. Similarly, the node 702 which is a wireless host which in FIGS. 7A and 7B appeared to be like a display screen, is simplified simply to be a square inasmuch as the details of the display screen are not likely to be recognized at the smaller size.

Figure 8:
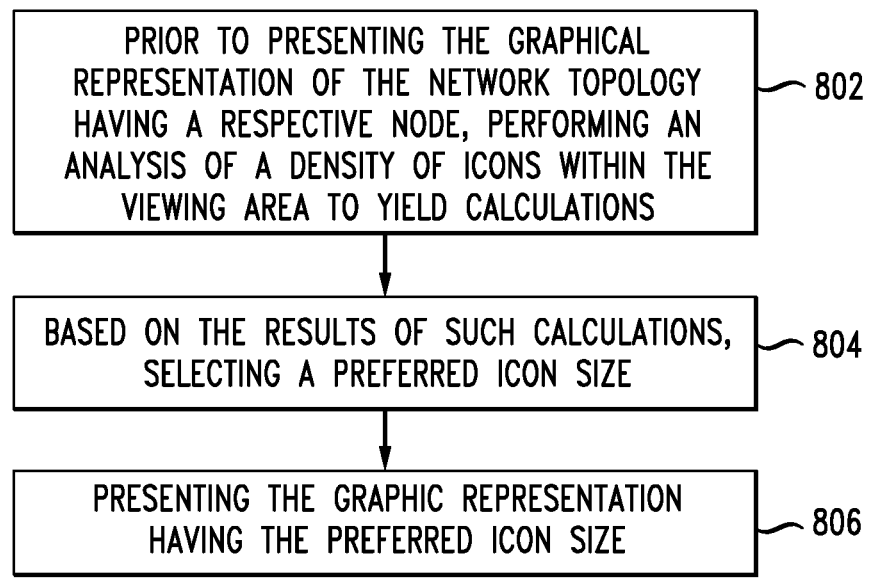
FIG. 8 illustrates a method example associated with how to adjust a size and/or other features of various components in a graphical representation of a network topology in response to a user providing input to either zoom in or zoom out of the network topology.

FIG. 8 illustrates a method aspect of this disclosure. The disclosure provides a method practiced by a system for adjusting a node size in a graphical representation of a network topology. The system, prior to presenting the graphical representation of the network topology having a respective node, performs an analysis of a density of icons within the viewing area (802). The system can also calculate a potential overlapping percentage in different icon sizes. Based on the results of such calculations, the system will select a preferred icon size or size of the respective node (804) and include that size in the graphical representation (806). The benefit of this approach is that it can be performed in real time such that any time a user zooms in or zooms out or changes a graphical view of the network topology, the algorithm can apply such that the resulting change in the graphical view will be presented to the user with an appropriate icon size, shape or configuration. At different size levels, the system can also adjust an amount of detail for individual nodes or icons. For example, a small icon can simply be a shape and one color. As the size grows, more detail can be provided that can be perceived properly by a user viewing the graphical interface.

In one aspect, the algorithm can limit the percentage of change in the nodes to a particular number. For example, in a realignment, the system may not increase or decrease the size by more than 15%. The system may also store two different node sizes and the adjustments may simply involve switching between a larger node size and a smaller node size, or switching between three specific sizes. The individual user or an administrator can configure the changes to be of a fixed size or a variable size. The user may want all nodes always at the same size, or if there are less than 10 nodes, the user can choose the node size to be X. The sizes of the nodes can also be selectable, such as a 64×64 pixel size or a 12×12 pixel size. At the smaller size icons, the system provides one color and a simple shape such as a circle or a square representing a router or a host, for example. For larger icons such as a 64×64 or 128×128 the system can automatically add different colors and additional complexity as the user will be able to actually view.

Node Aggregation/Expansion

The next aspect of this disclosure relates to the aggregation/collapse and expansion algorithms that enable more or fewer devices to be shown in a topology graph or network virtualization diagram based on a level of zoom and/or a level of interest. The process of aggregation can involve gathering data about each individual component which can include its location, its operating system and/or software capabilities, its hardware components, administrative information such as which company division uses that component and for what, etc. Once the system aggregates all of this cases, it can automatically or manually with input from users generate the collapsing/expanding algorithms which will change the graphical interface with respect to how many components are being presented. Then, another algorithm is used to track user interactions with the graphical interface and make determinations with respect to collapsing or expanding visual features of the graphical interface.

Tags can be used to provide values or hierarchical information to individual components to enable proper aggregation/collapse and/or expansion. For example, a tag can refer to or indicate an operating system, a user group, a device location, a GPS location, a building name, a hardware capability, a licensing package, or any other parameter or characteristic associated with that component that can be used in a hierarchical fashion or any other fashion. The tag can be assigned manually or automatically generated by the component or a remote service, such as through a location based service. Thus, in the disclosure herein, when the aggregation/expansion algorithm analyzes the graphical presentation and makes expansion or contraction decisions, the algorithm can base those decisions at least in part on tagged information assigned to each component.

In one respect, once components have been tagged with characteristics of each component, a system can combine and organize all of the tagged information. Components can have more than one tag assigned as well. Thus, the resulting dataset can include information such as all components within a particular building or location or all the servers used by the accounting group at a company. With the basic organization having been processed, users can then create personalized datasets for their own aggregation/expansion algorithms. In other words, with each component tagged with various data about its characteristics such as location, hardware type, software capabilities, etc., a user could tailor how aggregation and collapsing is performed as they navigate the graphical interface. One user might be really interested in components with the same operating system and within the same geographic building or city. Another person might want to view all components used by the same engineering lab or the same company, and so forth. Thus, users can provide a detailed level of customization to the algorithm.

In one respect, the concepts disclosed herein can be implemented as a tool that can be a front-end library software component. Data models can be defined for the various pieces of information and tags associated with the components. The tool can simply receive the various data about the end components through an application programming interface or the like, and can assign values according to a common topology model to characterize that data and then utilize the data in the common topology model for the collapsing/expanding algorithm.

The common topology model can follows the Graph abstract data type in the JSON format, which stands for the JavaScript Object Notation and is an open standard that uses human readable text to transmit data objects consisting of attribute-value pairs. Typically, each model has a node property and a link property which refers to a graph's vertices and edges, respectively. The node's property is used to define a collection of nodes. Each node is the JSON description of one of the nodes in the topology. An x and a y can be used as coordinates to define the position of each subject node. The links property can be used to define a collection of links. Each link is a JSON description of one of the links in the topology. In one example, each link will have at least two attributes: source and target, which are the key of the two nodes that are being connected with the link. The node attributes can either be the node's id or the node's index. The link property is also used to describe additional information about the link such as interface/bandwidth/link type. Additionally, it can also be used to describe other drawing information, such as the Bézier curvature attributes of the link's representation.

The following is example code which indicates some topology data. While this particular protocol is not required to practice the concepts disclosed herein, this code provides an example of how topology data for a component can be structured:

```
var topologyData = {
    nodes: [
        {"id": 0, "x": 410, "y": 100, "name": "12K-1"},
        {"id": 1, "x": 410, "y": 280, "name": "12K-2"},
        ...
    ],
    links: [
        {"source": 0, "target": 1},
        ...
    ]
};
```

While viewing a network topology with many different icons, a user may click on or otherwise select an icon that represents particular group of components, such as sensors. Any mode of interaction with a graphical component can apply. As a result of the selection or interaction, the system will respond to show all of the nodes or components associated with the icon. However, given the complexity of some network topologies, this operation will change the overall view to add say 5 additional components from the group in place of what used to be a single icon representing the group. The complexity of the graphical interface increases. In order to solve this problem, advanced "interest algorithms" and methods account for a level of interest to allow the opening or expansion of one particular group while causing the closing or collapsing of another group. For instance, if a user is expanding the view of a core network, the view of the core network may be substantially simplified by closing any open listings of individual components.

Figure 9A:
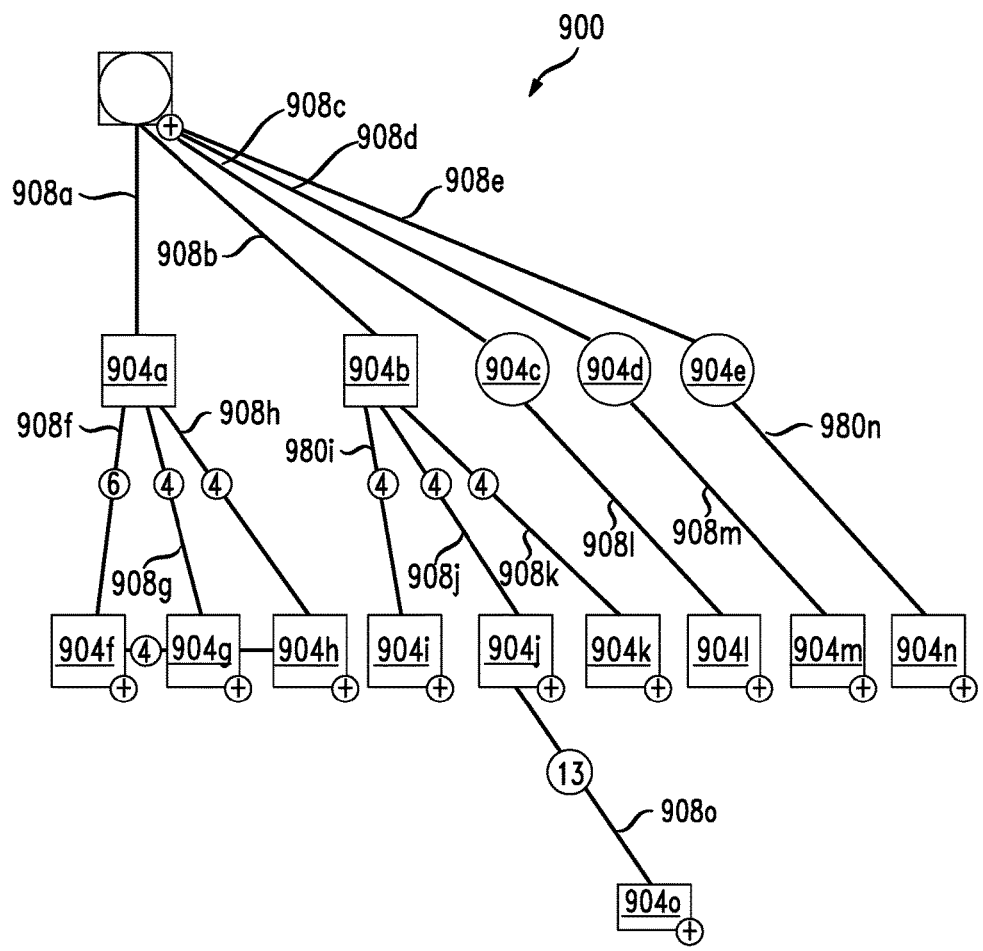
FIG. 9A illustrates another graphical interface displaying a network topology at a time t1 and is related to aggregation and expansion of components in a graphical representation of a network topology.

FIG. 9A is a diagrammatic representation of a network topology graph or network virtualization diagram 900, as displayed on a display screen such that the network topology graph may be manipulated by a user. Assume that the network virtualization diagram 900 is in a first state at a time t1. At a time t1, a network topology graph displays components 904*a-o* and components 908*a-o*. In one aspect, components 904*a-o* may be objects such as routers, sensors, and/or IoT things. Components 908*a-o* can be individual links or groups of links. In some cases, numbers between links such as between 908*f* and 904*f* identify the group of links represented by the connection. By way of example, component 908*a* may represent an individual link while component 908*f* may represent six links and component 908*e* may represent a number of links which may be displayed upon selecting component 908*e*.

A plus "+" sign associated with a component indicates that additional components can be displayed in connection with the component. Thus, when a user selects the plus "+" sign, additional components can be displayed. In other words, the presence of a plus "+" sign indicates to the user that components have been aggregated or collapsed beneath the respect node, icon or component.

Figure 9B:
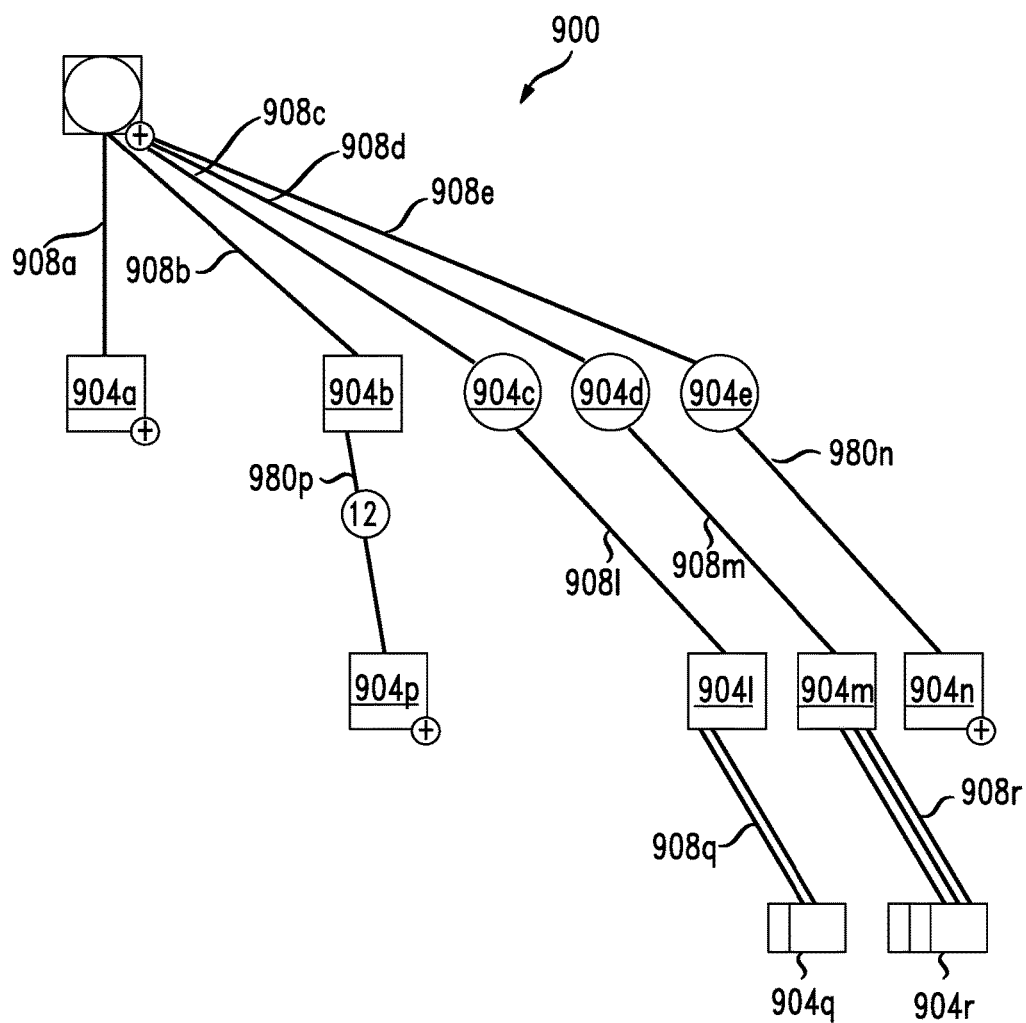
FIG. 9B illustrates a graphical interface displaying an updated network topology at a time t2 and related to aggregation and expansion of components in a graphical representation of a network topology.

In general, the opening or expansion of one component may cause another component to substantially automatically close or collapse. FIG. 9B is a diagrammatic representation network virtualization diagram 902 in a second state at a time t2. At a time t2, components 904*l*, 904*m* have been expanded, as for example due to a user electing to expand components 904*l*, 904*m*. The expansion of component 904l results in components 904*q* and components 908*q* being displayed in network virtualization diagram 902, and the expansion of component 904*m* results in components 904*r* and components 908*r* being displayed in network virtualization diagram 902.

When additional components 904*q*, 908*q*, 904*r*, 908*r* are displayed in network virtualization diagram 902, to maintain a relatively simplified view of network virtualization diagram 902, components 904*f-h* and components 908*f-h* have been collapsed. The collapse of components 904*f-h* and components 908*f-h* is represented by a plus "+" sign associated with component 904*a*. In addition, components 904*i-k*, components 904*o*, and component 908*o* have been collapsed and are represented by a component 904*p*. Similarly, components 908*i-k* have also been collapsed and are represented by a component 908*p*. Component 908*p* includes an indication that at time t2, component 908*b* represents twelve links which were represented by components 908*i-k* at time t1.

The shapes of individual components, or icons representing individual components, can be maintained in a network virtualization diagram even when the network virtualization diagram is fully zoomed out, as discussed above. It should be appreciated, however, that in some cases, not all of the shapes of the individual components are maintained in a fully zoomed out view of a network virtualization diagram. For example, at least some components can be represented as dots or other icons without departing from the spirit or the scope of the present disclosure.

Figure 10A:
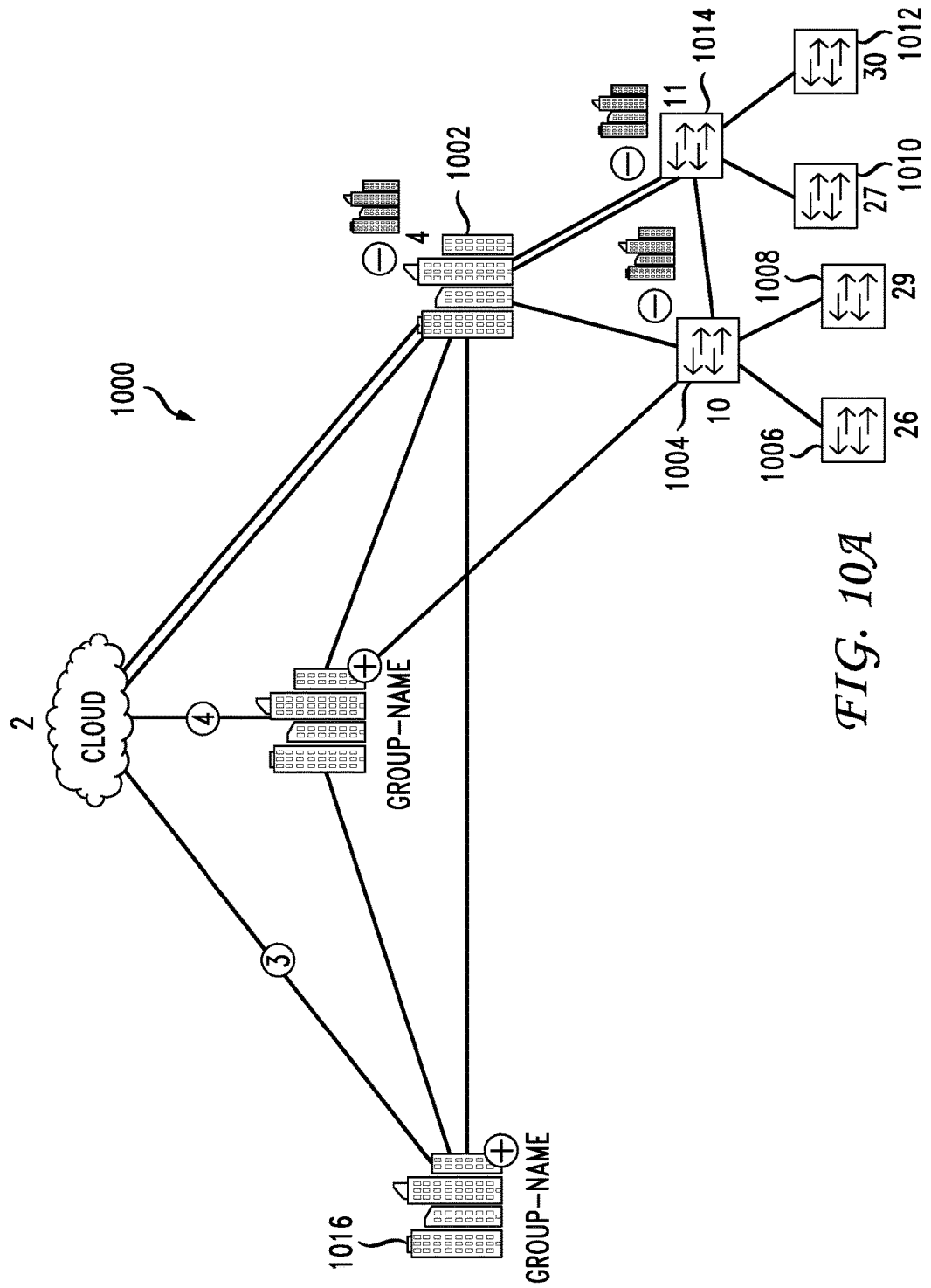
FIG. 10A illustrates another example network topology, at a time t1, in a graphical interface related to aggregation and expansion of components.
Figure 10B:
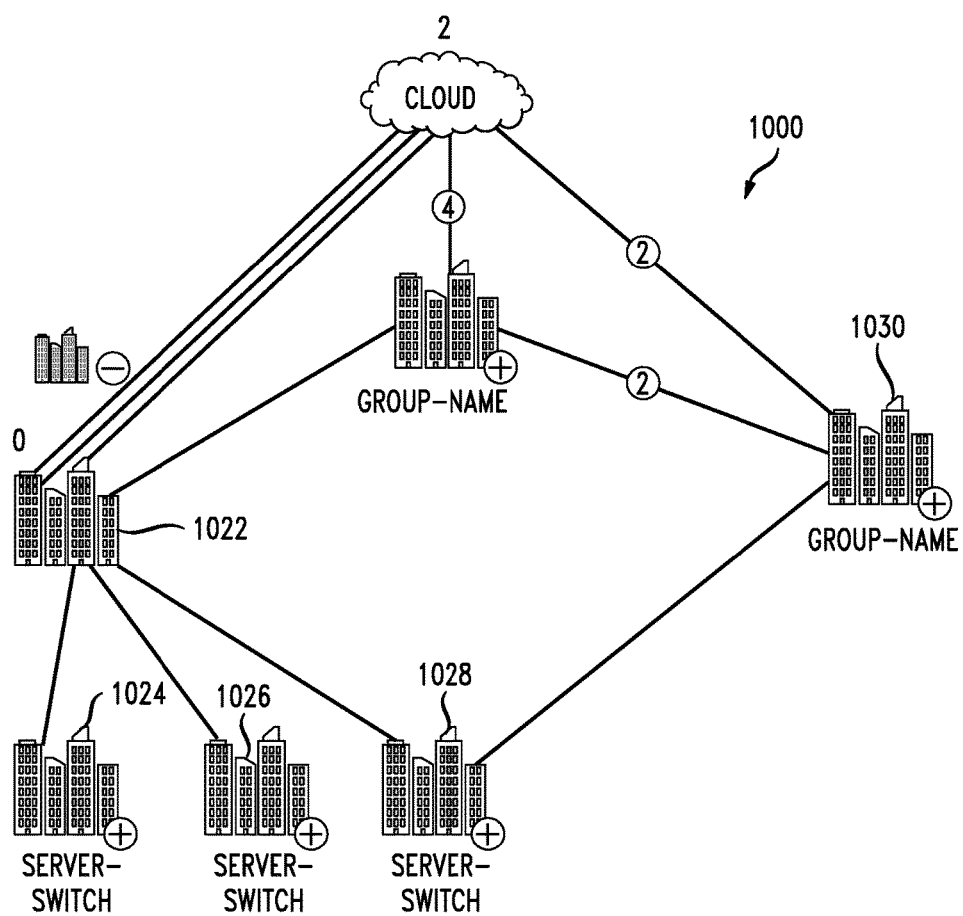
FIG. 10B illustrates an updated network topology from FIG. 10A at a time t2.

FIGS. 10A and 10B provide another example of the collapsing/expansion algorithm. Assume in FIG. 10A that the network topology 1000 is being presented to a user at time t1. As can be appreciated, various components such as components 1002, 1004, 1006, 1008, 1010, 1012 and 1014 are shown in an expanded format all being interconnected. Component 1016 is also shown representing a group of components. Notice the "+" indicates to the user that there are additional components "underneath" component 1016.

Assume in FIG. 10B that a user has selected the "+" associated with node 1016. In this case, at time t2, the network topology 1020 of FIG. 10B will be presented. The expansion of the components underneath 1016 is shown as component 1022, 1024, 1026 and 1028. Note however, that given the interest that the user has in the components under 1016, the algorithm will analyze the network topology 1000 and what will be presented in network topology 1020 and analyzes the density of nodes and the interest level in nodes and determines to automatically collapse some lower valued nodes. For example, nodes 1002, 1004, 1006, 1008, 1010, 1012, 1014, are now represented under a group of nodes with component 1030. These may have been collapsed based on a number of factors. For example, they may be collapsed based on a geographic distance from node 1016. They may be collapsed because of the hierarchical nature of the various types of components that are being expanded or collapsed. There could be automatic or manually-based presets. For example, the user may include a preset value in which when a node is expanded that the system should do an analysis of location proximity and collapse groups of nodes outside of that proximity. The user may manually or the system may automatically analyze the types of devices or the roles of devices (such as edge routers, core components, distribution components, access components, host components, and so forth) and determine that a certain type of device, if it is shown for example in FIG. 10A, has the priority in terms of being collapsed when the user expands 1016. Thus, there are numerous factors that the algorithm can implement when determining what components to collapse when some components are expanded. Therefore, FIG. 10B represents a result of the application of the algorithm which enables the system to maintain a reasonable density of displayed nodes on the screen and eliminates some nodes that it deems to be irrelevant or less relevant and thus would otherwise be background noise. The end result is an improved viewing experience. Of course, the user can configure the automatic collapsing mechanism to be on or off or triggered by a certain action or by a certain density. For example, the algorithm may only apply if the expansion request of a user causes there to be more than 40 nodes displayed on the screen. Thus, the density of the nodes to be displayed after an expansion operation can be set to trigger the automatic collapsing algorithm.

As noted above, the algorithm can be customizable so that the definition of irrelevant or less relevant nodes can be different for different users. In one case, geography might be the primary value in what to expand as physically distant nodes are less relevant. In another case, nodes of a different operating system (or any parameter) to the operating system (or any parameter) of the node clicked on might be less relevant. Thus, a user might click on a node that streams video to client devices. The algorithm can be tailored for that user to value streaming nodes to be of higher value. Thus, related nodes and networks that perform non-streaming tasks are aggregated while streaming nodes are expanded to show more detail.

Background color can also be a part of the topology. In some respects, based on the tags or other information, the background color can also change to identify that a group of nodes within the same color of the background are part of the same category (geographically or otherwise). Thus, in addition to aggregating and expanding components, the graphical interface can also adjust background colors to further provide data about component relationships. Background patterns can also be used as well to highlight relationships and indicate to the user that nodes shown with a particular pattern in their background are related in some fashion.

Figure 11:
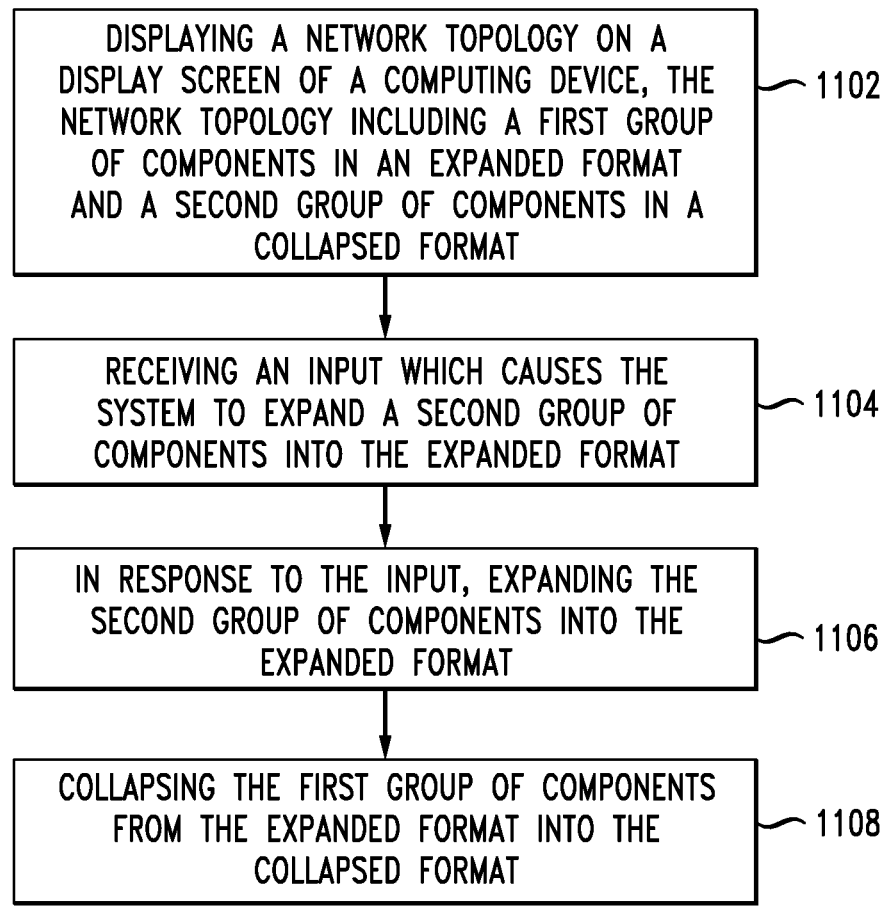
FIG. 11 illustrates an example method of the aggregation/expansion algorithm.

FIG. 11 illustrates a method aspect of this disclosure. The method includes displaying a network topology on a display screen of a computing device, the network topology including a first group of components in an expanded format and a second group of components in a collapsed format (1102). The method includes receiving an input, the input being initiated by a user and arranged to cause the second group of components to be expanded into the expanded format (1104). For example, a user can click on an icon associated with the second group of components thus indicating that the user desires to expand the second group of components into the expanded format. In response to the input, the system expands the second group of components into the expanded format (1106) and collapses the first group of components from the expanded format into the collapsed format (1108). Expanding the second group of components automatically causes the first group of components to be collapsed into the collapsed format. In some respects, the system can determine to collapse the first group of components based on one or more of a parameter and the input, as set forth below.

The algorithm that performs the automatic collapsing and/or expanding of groups of components can apply one or more parameters in making the decisions to change the visual representation of the network topology. The parameter include one or more of: a virtual location of the first group of components, a level of expansion of the first group of components, a hierarchical value of at least one component in the first group of components, a geographic location of at least one component of the first group of components, a user profile, an interest level, a zoom level, the interest level relative to the zoom level, a type of at least one component, a preset value, a threshold, a density evaluation of the overall topology or a portion of the topology, a role of a component, a location proximity to the action taken by the user to cause an expansion or collapse, a type of device or devices to be automatically expanded or contracted, a hierarchical role of various devices in a visual representation that is being analyzed prior to being presented, a density of nodes, whether a node is a low-level leaf node, a geographic distance of a node or group of nodes relative to the user's operation, and so forth. Any of these parameters can be mixed and matched with any other parameter to arrive at the final conclusion. The parameter can be also coordinated with the input from the user such that the collapsing or expanding is performed automatically on a different group of components than the user interacted with but has the result of maintaining a pleasing viewing experience of the network topology.

The input can be, for example, the user clicking on a graphical icon associated with the second group of components and indicating that the second group of components should be expanded into the expanded format. Any mode of interacting with the graphical icon to indicate a desire to expand/contract a group of components can apply.

The parameter can be applied, by way of example, with respect to it being the geographical location of at least one component of the first group of components, by evaluating a relative distance geographically (or virtually) of the first group of components to the second group of components. Similarly, if the parameter is the interest level, collapsing the first group of components can be based on the interest level associated with the first group of components being determined to be relatively low when compared with other component. For example, the average "interest level" of the various displayed components might be 7 (on a scale of 1 to 10) and the first group of components may have an interest level of 4. In that case, because its relative interest level is lower than others, it will be collapsed to improve the network topology.

It is noted that while the description above involves the user selecting an expansion and the algorithm in real-time automatically contracting some nodes to maintain a pleasing network topology, the opposite steps could also apply. The user may provide input to collapse a group of nodes into a single icon or graphical representation. In this case, the graphical interface becomes simpler with less density as there are not as many nodes to present. In this case, the algorithm may actually then evaluate the environment, using the various parameters above, and may determine to expand certain nodes into the expansion mode to reveal more underlying components. This would occur in the opposite way as described above. For example, nodes that are collapsed but geographically close, or virtually close, to the user, can be expanded without inhibiting the pleasing network topology that is shown. The chosen expanded nodes can be nodes with a higher interest level, rather than a lower interest level. Thus, all the parameters apply to the algorithm where is can make determinations of whether to expand a node rather than just automatically collapse some nodes. Of course, whether nodes adjusted are those of high interest or low interest according to the algorithm will depend on whether the adjustment of the nodes is an expansion or a contraction.

The various aspects disclosed herein can be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the examples. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, computer-readable storage device, or a machine-readable medium excludes signals or signals embodied in carrier waves.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   displaying, via a computing device, a network topology having a first group of components in an expanded format and a second group of components in a collapsed format;
   receiving, via a processor, an input initiated by a user and associated with the second group of components;
   changing, based on the input, the second group of components from the collapsed format into the expanded format to yield the second group of components in the expanded format;
   changing, based on a parameter and based on the input associated with the second group of components, the first group of components from the expanded format into the collapsed format, the parameter including one or more of a location of the first group of components, a level of expansion of the first group of components, a user profile, an interest level, a zoom level, the interest level relative to the zoom level or a threshold to yield the first group of components in the collapsed format, wherein the location of the first group of components is a geographical location of the first group of components, and the changing of the first group of components to yield the first group of components in the collapsed format is performed because the parameter indicates that the first group of components is relatively distant from the second group of components; and
   displaying, via the computing device, the first group of components in the collapsed format and the second group of components in the expanded format,
   wherein the changing of the second group of components to yield the second group of components in the expanded format automatically causes the first group of components to be changed from the expanded format to the collapsed format.

2. The method of claim 1, wherein,
   the parameter includes the threshold, and
   the threshold is based on a screen density of the computing device.

3. The method of claim 1, wherein the input comprises the user clicking on a graphical icon associated with the second group of components and indicating that the second group of components should be expanded into the expanded format.

4. The method of claim 1, wherein,
   the parameter includes the interest level, and
   the changing of the first group of components to yield the first group of components in the collapsed format is based on the interest level associated with the first group of components being determined to be relatively low when compared with other components in the network topology.

5. The method of claim 1, wherein,
   the parameter includes a virtual location of the first group of components, and
   the changing of the first group of components to yield the first group of components in the collapsed format is performed because the parameter with the virtual location indicates that the first group of components is relatively distant from the second group of components.

6. A system comprising:
   a processor; and
   a computer-readable medium, storing instructions which, when executed by the processor, cause the processor to perform operations comprising:
   displaying a network topology having a first group of components in an expanded format and a second group of components in a collapsed format;
   receiving an input initiated by a user and associated with the second group of components;
   changing, based on the input the second group of components from the collapsed format into the expanded format to yield the second group of components in the expanded format;
   changing, based on a parameter and based on the input associated with the second group of components, the first group of components from the expanded format into the collapsed format, the parameter including one or more of a location of the first group of components, a level of expansion of the first group of components, a user profile, an interest level, a zoom level or a threshold to yield the first group of components in the collapsed format, wherein the location of the first group of components is a geographical location of the first group of components, and the changing of the first group of components to yield the first group of components in the collapsed format is performed because the parameter indicates that the first group of components is relatively distant from the second group of components; and displaying the first group of components in the collapsed format and the second group of components in the expanded format, wherein the changing of the second group of components to yield the second group of components in the expanded format automatically causes the first group of components to be changed from the expanded format to the collapsed format.

7. The system of claim 6, wherein, the parameter includes the threshold, and the threshold is based on a screen density.

8. The system of claim 6, wherein the input comprises the user interacting with a graphical icon associated with the second group of components to indicate that the second group of components should be expanded into the expanded format.

9. The system of claim 6, wherein, the parameter includes the interest level, and the changing of the first group of components to yield the first group of components in the collapsed format is based on the interest level associated with the first group of components being determined to be relatively low when compared with interest levels of other components in the network topology.

10. The system of claim 6, wherein, the parameter includes a virtual location of the first group of components, and the changing of the first group of components to yield the first group of components in the collapsed format is performed because the parameter with the virtual location indicates that the first group of components is relatively distant from the second group of components.

11. A non-transitory computer-readable storage device storing instructions which, when executed by a processor, cause the processor to perform operations comprising:

displaying a network topology including a first group of components in an expanded format and a second group of components in a collapsed format;

receiving an input initiated by a user and associated with the second group of components;

changing, based on the input, the second group of components from the collapsed format into the expanded format to yield the second group of components in the expanded format;

changing, based on a parameter and based on the input associated with the second group of components, the first group of components from the expanded format into the collapsed format, the parameter including one or more of a location of the first group of components, a level of expansion of the first group of components, a user profile, an interest level, a zoom level, the interest level relative to the zoom level or a threshold to yield the first group of components in the collapsed format, wherein the location of the first group of components is a geographical location of the first group of components, and the changing of the first group of components to yield the first group of components in the collapsed format is performed because the parameter indicates that the first group of components is relatively distant from the second group of components; and displaying the first group of components in the collapsed format and the second group of components in the expanded format, wherein the changing of the second group of components to yield the second group of components in the expanded format automatically causes the first group of components to be changed from the expanded format to the collapsed format.

12. The non-transitory computer-readable storage device of claim 11, wherein, the parameter includes the threshold, and the threshold is based on a screen density.

13. The non-transitory computer-readable storage device of claim 11, wherein the input comprises the user interacting with a graphical icon associated with the second group of components to indicate that the second group of components should be expanded into the expanded format.

14. The non-transitory computer-readable storage device of claim 11, wherein, the parameter includes the interest level, and the changing of the first group of components to yield the first group of components in the collapsed format is based on the interest level associated with the first group of components being determined to be relatively low when compared with interest levels of other components in the network topology.

\* \* \* \* \*